United States Patent [19]

Weston

[11] Patent Number: 4,792,952
[45] Date of Patent: Dec. 20, 1988

[54] SIGNAL RECEIVER

[75] Inventor: Clive R. Weston, Hayes, England

[73] Assignee: EMI Limited, Hayes, England

[21] Appl. No.: 864,866

[22] Filed: May 20, 1986

[30] Foreign Application Priority Data

May 24, 1985 [GB] United Kingdom ................. 8513218

[51] Int. Cl.⁴ ............................................. G06F 11/10
[52] U.S. Cl. ........................................ 371/30; 371/43
[58] Field of Search .................. 371/43, 37, 38, 44, 371/45, 39, 40; 364/200, 900; 325/363; 375/39, 27, 43

[56] References Cited

U.S. PATENT DOCUMENTS

| 4,471,485 | 9/1984 | Prevot | 371/37 |
| 4,475,219 | 10/1984 | Puckette | 375/84 |
| 4,519,080 | 5/1985 | Synder | 371/43 |
| 4,569,050 | 2/1986 | Ohme | 371/37 |
| 4,631,735 | 12/1986 | Oureshi | 371/43 |
| 4,641,327 | 2/1987 | Wei | 371/43 |
| 4,653,053 | 3/1987 | Pelchat | 371/43 |
| 4,654,854 | 3/1987 | Heppe | 371/43 |

FOREIGN PATENT DOCUMENTS 2136249A 9/1984 United Kingdom .

Primary Examiner—Michael R. Fleming
Attorney, Agent, or Firm—Fleit, Jacobson, Cohn & Price

[57] ABSTRACT

A receiver for the demodulation of FSK signal for passage to ancillary equipment has an error-corrector prior to demodulator. In preparing received signals for error-correction, they are passed to a counter which notes the number of cycles within each symbol of the signal. Thereafter, this count is used by a calculator and a classifier to derive a confidence level indicating the degree of certainty of the symbol having the carrier frequency. This confidence level is used in the error-correcting and/or demodulation operations.

12 Claims, 1 Drawing Sheet

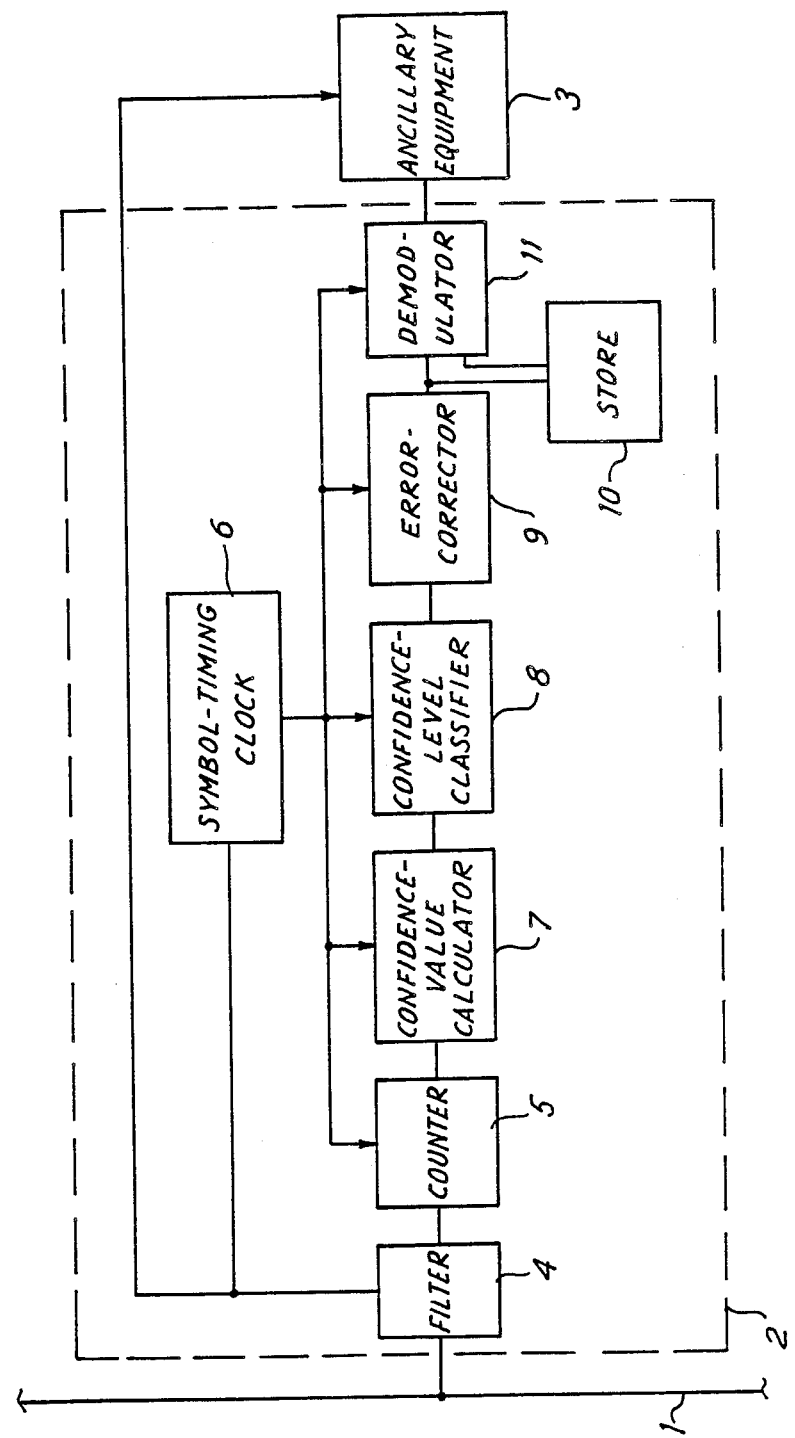

SIGNAL RECEIVER

FIELD OF THE INVENTION

The present invention relates to equipment for use with signals subject to frequency-key-shift (FSK) modulation.

DESCRIPTION OF RELATED ART

Generally, conventional FSK demodulators employ analogue circuitry in the form of a phase-locked loop arrangement to recover the data, the loop incorporating a low-pass filter to control the circuit stability and to deter extraneous signals. Once the data signal is demodulated, it may be subjected to standard error-correcting techniques in order to restore it to a form as similar as possible to that as when originally transmitted.

OBJECTS OF THE INVENTION

An object of the present invention is to provide an FSK demodulation receiver which incorporates digital processing components.

Another object of the present invention is to provide an FSK demodulation receiver whose performance is not significantly affected by extraneous signals.

SUMMARY OF THE INVENTION

The present invention provides equipment for the processing of for FSK modulated signals at a carrier frequency and formed of a plurality of symbols, the equipment comprising:

means to determine digitally a confidence characteristic for the modulation state of a symbol within a received signal;

means to error-correct the signal in accordance with the output of the confidence-determining means;

and means to demodulate a received signal in dependence on the output from the error-correcting means.

Preferably, the confidence-determining means allocates to each symbol one of four or more predetermined confidence levels relating to the modulation state of that symbol; advantageously, there are eight possible confidence levels.

In this way, the receiver can achieve a more exact demodulation of the received signal, because any errors in the latter are minimised before the modulation operation is effected. Thus, the additional information provided by the confidence operation allows discovery of which bit or bits in the code group are most likely to be in error, so that appropriate correction can thereafter be done.

Thus, the error-correction means receives information which indicates the degree to which a symbol approximates to either modulation state. The confidence information may be produced directly from the received signal by monitoring signal crossings on the transmission line or channel.

Preferably, the confidence-determining means includes means to determine the carrier frequency over a number of cycles of a symbol.

Preferably, the confidence-determining means comprises: means to count the number of cycles, at the carrier frequency, in a given symbol of the signal; and means to assign a confidence characteristic to that symbol in accordance with the output from the counting means. If the ratio of carrier frequencies to baud rate and the separation of the carrier frequencies are such that there is a difference of eight or more cycles between a transmitted high and low, the counting means may be reset at the start of a symbol and read at the end of that symbol. For an alterative operational mode, the confidence-determining means may have means to produce an indication of the average length of time of the carrier cycles in a given symbol, and means to assign a confidence characteristic to that symbol in accordance with the output from the indication means.

Preferably the error-correcting means has means to utilize the confidence characteristic for one or more other symbols in the error-correction operation for any given symbol. Additionally or alternatively, when the demodulation means is operating on any given symbol, it may make use of, or refer to, the confidence characteristic for one or more previous symbols (and/or one or more subsequent symbols) within the signal.

Another aspect of the present invention provides a method of processing FSK-modulated signals at a carrier frequency and formed of a plurality of symbols, the method comprising:

determining digitally a confidence characteristic for the modulation state of a symbol within a received signal;

error-correcting the signal in accordance with the determined confidence characteristics;

error-correcting the signal in accordance with the determined confidence characteristics;

and demodulating the resultant signal.

Preferably in the method, the stage of determining a confidence characteristic includes allocating, to each symbol of a received signal, one of four or more (advantageously eight) predetermined confidence levels relating to the modulation state of that symbol.

Preferably the confidence-determining stage comprises determining the carrier frequency over a number of cycles of a symbol.

Preferably, the error-correcting stage of the method includes utilizing the determined confidence characteristics of one or more other symbols in the error-correction operation for any given symbol.

Preferably, the confidence-determining stage comprises: counting the number of cycles, at the carrier frequency, in a given symbol of the signal; and assigning a confidence characteristic to that symbol in accordance with the resultant count. Additionally or alternatively, the confidence-determining stage may provide producing an indication of the average length of time of the carrier cycles in a given symbol, and assigning confidence characteristic to that symbol in accordance with the resultant indication.

BRIEF DESCRIPTION OF THE DRAWINGS

In order that the invention more readily be understood, a description is now given, by way of example only, reference being made to the accompanying sole FIGURE which shows schematically a receiver embodying the present invention.

DESCRIPTION OF THE PREFERRED EMBODIMENT

The sole FIGURE shows a line 1 of an FSK-modulated transmission system (not shown) to which is connected a receiver 2 for demodualtion of signals forming messages intended for it, before passage to ancillary equipment 3. Each message would consist of one or more symbols in FSK-modulated form, with a carrier frequency Ca and a shifted frequency (Ca+F)

and a transmission rate of b baud. The receiver 2 has a switched capacitative filter 4 which removes substantially all of the unwanted signals reaching it, and thereafter passes the desired signals to a counter 5. Also, when filter 4 detects any signal with carrier frequency Ca, it generates a "carrier detect" signal to synchronise a symbol-timing clock 6 to the start of a message; the "carrier detect" signal can also be used to inform the equipment 3 of the reception of a possible message. The clock 6 is synchronous and runs at the band rate, being reset by the occurrence of any "carrier detect" signals to ensure that the processing of the received messages are timed correctly.

Counter 6 notes the number of cycles (at carrier frequency Ca), hereinafter called X, which occur within each symbol of the received message, and passes on this information to a confidence-value calculator 7 which determines an "absolute" value for the confidence Co of that symbol being of the shifted frequency. In order to achieve this, the calculator 7 performs the calculation:

$$Co = (bX - Ca)/F.$$

The calculator 7 passes the value of Co appropriate to that symbol to a confidence-level classifier 8 which assigns, to that symbol, whichever of the eight confidence levels between "0" and "7" is appropriate. The confidence levels are arranged such that level "0" refers to there being a certainty of the symbol having the carrier frequency, level "7" refers to there being a certainty of the symbol having the shifted frequency, and the intervening levels referring to intermediate equally-spaced degrees of certainty.

Once the symbol has been assigned an appropriate confidence level, it is passed to an error-corrector 9, the resultant signal then being passed on to both a store 10 and a demodulator 11, of which the latter decodes it from the FSK form to the normal binary form. Thus the error-corrector 9 may operate on a symbol such as to take account of the confidence levels of other symbols. Additionally or alternatively, when performing the demodulation operation, demodulator 11 utilizes (if considered appropriate) the confidence levels relating to previous symbols, a record of the levels being available in store 10. In a modification, no store 10 is provided, but rather the internal storage in error-corrector 9 is used to hold a record of previous levels.

By providing the confidence-determination and the error correction before demodulation in the receiver 1, the decoding operation is substantially free of unwanted external signals or of corruptions in the intended signal, thereby achieving a resultant immunity similar to that afforded by the loop filter in conventional demodulators, although the respective methods of producing these results are completely different.

In a modification to the receiver 1, particularly suited to circumstances in which the ratio of carrier frequencies to baud rate are such that there is at least a difference of eight carrier cycles between a transmitted high and transmitted low, the counter 5 could be a simple carrier cycle counter which is reset at the start of a symbol and produces a read-out at the end of the symbol, there being no necessity for having a calculator 7.

The receiver 1 may be formed of an assembly of discrete electronic components on a tracked substrate (e.g. a printed circuit board) or it may be fabricated from one or more solid-state integrated circuit devices; at least some of the functions of receiver as described above may be achieved by microprocessors with the appropriate software.

A receiver (or a method of signal processing) embodying the present invention may be used in any suitable application incorporating FSK-modulated signals, for example in data transmission systems or in data recording/playback equipment.

I claim:

1. Equipment for the processing of FSK modulated signals at a carrier frequency and formed of a plurality of symbols, the equipment comprising: means to determine digitally a confidence characteristic for the modulation state of a symbol within a FSK modulated signal at a carrier frequency; means to error-correct the signal in accordance with the output of the confidence-determining means; and means to demodulate a received signal as output from the error-correcting means.

2. Equipment according to claim 1, wherein the confidence-determining means including means to determine the carrier frequency over a number of cycles of a symbol.

3. Equipment according to claim 1, wherein the confidence-determining comprises: means to count the number of cycles, at the carrier frequency, in a given symbol of the signal; and means to assign a confidence characteristic to that symbol in accordance with the output from the counting means.

4. Equipment according to claim 1, wherein the confidence-determining means has means to produce an indication of the average length of time of the carrier cycles in a given symbol; and means to assign a confidence characteristic to that symbol in accordance with the output from the indication means.

5. Equipment according to claim 1, wherein the confidence-determining means has means to allocate, to each symbol, one of four or more predetermined confidence levels relating to the modulation state of that symbol.

6. Equipment according to claim 1, wherein the error-correcting means comprises means to utilize the confidence characteristics of one or more other symbols in the error-correction operation for any given symbol.

7. A method of processing FSK-modulated signals at a carrier frequency and formed of a plurality of symbols, the method comprising:
determining digitially a confidence characteristic for the modulation state of a symbol within a received signal; error-correcting the signal in accordance with the determined confidence characteristics; and demodulating the resultant signal.

8. A method according to claim 7, wherein the confidence-determining stage comprises determining the carrier frequency over a number of cycles of a symbol.

9. A method according to claim 7, wherein the confidence-determining stage comprises: counting the number of cycles, at the carrier frequency, in a given symbol of the signal; and assigning a confidence characteristic to that symbol in accordance with the resultant count.

10. A method according to claim 7, wherein the confidence-determining stage comprises: producing an indication of the average length of time of the carrier cycles in a given symbol; and assigning a confidence characteristic to that symbol in accordance with the resultant indication.

11. A method according to claim 7, wherein the stage of determining a confidence characteristic includes allocating, to each symbol of a received signal, one of four or more predetermined confidence levels relating to the modulation state of that symbol.

12. A method according to claim 7, wherein the error-correcting stage comprises utilizing the confidence characteristics of one or more other symbols in the error-correction operation for any given symbol

* * * * *